US010961985B2

(12) United States Patent
Christiansen et al.

(10) Patent No.: US 10,961,985 B2
(45) Date of Patent: Mar. 30, 2021

(54) WIND TURBINE AND METHODS INCLUDING MAIN SHAFT INTEGRATED WITH LOCKING DISC

(71) Applicant: Vestas Wind Systems A/S, Aarhus N. (DK)

(72) Inventors: Thomas Møller Christiansen, Hjortshøj (DK); Erik Markussen, Videbæk (DK); Jeppe Hesseldal Otten, Åbyhøj (DK); Nicolaj Biltoft Kristensen, Silkeborg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 55 days.

(21) Appl. No.: 16/667,049

(22) Filed: Oct. 29, 2019

(65) Prior Publication Data

US 2020/0141394 A1    May 7, 2020

(30) Foreign Application Priority Data

Nov. 1, 2018 (DK) .......................... PA 2018 70711

(51) Int. Cl.
*F03D 80/00* (2016.01)
*F03D 7/02* (2006.01)

(52) U.S. Cl.
CPC ........... *F03D 80/00* (2016.05); *F03D 7/0244* (2013.01); *F03D 7/0248* (2013.01); *F03D 7/0264* (2013.01); *F03D 7/0268* (2013.01)

(58) Field of Classification Search
CPC .... F03D 7/0244; F03D 7/0248; F03D 7/0264; F03D 7/0268; F03D 80/00

(Continued)

(56) References Cited

U.S. PATENT DOCUMENTS 8,287,240 B2 * 10/2012 Nitzpon ................. F03D 13/10
416/204 R
2011/0135481 A1 * 6/2011 Koronkiewicz ........ F03D 15/00
416/220 R (Continued)

FOREIGN PATENT DOCUMENTS

CN          205638800 U    10/2016
KR       20140072561 A     6/2014

(Continued)

OTHER PUBLICATIONS

Danish Patent and Trademark Office, Search and Exam Report in PA 2018 70711, dated Apr. 3, 2019.

*Primary Examiner* — Mark A Laurenzi
*Assistant Examiner* — Mickey H France
(74) *Attorney, Agent, or Firm* — Wood Herron & Evans LLP

(57) ABSTRACT

A wind turbine includes a main shaft (34), a rotor hub (22), a plurality of blades coupled to the rotor hub (22), and a rotor locking disc (32), (32'). The main shaft (34) includes a front end portion (34*a*), and the front end portion (34*a*) includes a first connecting structure (36). The rotor hub (22) includes a second connecting structure (40). The first connecting structure (36) of the main shaft (34) is fixed to the second connecting structure (40) of the rotor hub (22). The rotor locking disc (32), (32') is integrally formed on the front end portion (34*a*) of the main shaft (34), and includes a peripheral region. A plurality of rotor locking elements (50), (50') are located in the peripheral region for receiving one or more rotor locking pins (30).

12 Claims, 5 Drawing Sheets

(58) Field of Classification Search
USPC .................................. 416/169 R, 152, 32, 14
See application file for complete search history.

(56) References Cited

U.S. PATENT DOCUMENTS

| | | |
|---|---|---|
| 2011/0309631 A1 | 12/2011 | Rebsdorf |
| 2015/0260164 A1* | 9/2015 | Su ........................... F03D 80/00 290/55 |
| 2020/0182227 A1* | 6/2020 | Rogg ..................... F03D 17/00 |

FOREIGN PATENT DOCUMENTS

| | | |
|---|---|---|
| WO | 2018065018 A1 | 4/2018 |
| WO | 2018072796 A1 | 4/2018 |

\* cited by examiner

WIND TURBINE AND METHODS
INCLUDING MAIN SHAFT INTEGRATED
WITH LOCKING DISC

TECHNICAL FIELD

The present invention relates to wind turbines generally including a tower and one or more nacelles mounted on the tower. The nacelle houses powertrain components, such as a main drive shaft coupled with a rotor. The invention more specifically relates to methods and apparatus for allowing the main drive shaft rotor hub to be selectively locked against rotation.

BACKGROUND

It is sometimes necessary to lock the rotor of a wind turbine against rotation when the wind turbine is not in use, such as during maintenance or at other downtimes. For this purpose, wind turbines have included rotor braking and locking systems. The braking system is designed to stop the rotor after the rotor has been slowed almost to a stop by the pitch of the blades. The locking system then locks the rotor against any rotation. Locking systems typically utilize locking members, such as pins, that move between locking and unlocking positions in either an axial or a radial direction relative to the direction of rotation of the rotor. The axial direction is parallel to the lengthwise axis of the wind turbine main shaft, while the radial direction is perpendicular to the lengthwise axis of the main shaft. The pin is moved into and out of engagement with a rotatable ring-like structure that is fixed for rotation with both the main shaft and the rotor hub. The present invention relates to those systems using one or more pins moving axially or parallel to the main shaft and the axis of rotation of the rotor rather than moving radially or perpendicular to the main shaft and axis of rotation. The components of rotor lock systems are usually large cast parts formed in one large piece. The main component is often a cast locking ring having a plurality of closed perimeter recesses that selectively receive rotor locking pins. The recesses may be blind bores or through bores.

The locking ring is comprised of one or more separate components fixed proximate or near the front end portion of the main shaft and rotates with the rotor hub and main shaft when the wind turbine is in operation. Such designs for the locking rings add to the weight of these already large scale assemblies. Further, the assembly of multiple large scale components together can present special challenges. For example, the handling of multiple components presents difficulties during assembly and installation procedures. Generally, this increases component and handling costs.

It would be desirable to provide apparatus and methods for rotor lock systems and for main shaft/rotor hub connections that address the various drawbacks and challenges associated with current technology. Specifically, it would desirable to provide manners in which the connections made between a main drive shaft and a rotor hub are more simplified thereby saving time and costs and creating a more efficient assembly process. In addition, it would be desirable to achieve weight savings as well as increased design freedom and modular abilities, while maintaining optimal strength characteristics.

SUMMARY

In an illustrative embodiment the invention comprises a wind turbine including a main shaft, a rotor hub, a plurality of blades coupled to the rotor hub, and a rotor locking disc. The main shaft includes a front end portion, and the front end portion includes a first connecting structure comprised of a first plurality of fastener holes. The rotor hub includes a second connecting structure. The first connecting structure of the main shaft is fixed to the second connecting structure of the rotor hub using the first plurality of fastener holes so that the main shaft and rotor hub rotate together. The rotor locking disc is integrally formed on the front end portion of the main shaft, and includes a peripheral region. The first plurality of fastener holes is more specifically located on the rotor locking disc. A plurality of rotor locking elements is located in the peripheral region for receiving one or more rotor locking pins moved in an axial direction relative to the lengthwise axis of the main shaft. The rotor locking elements may be of any desired configuration or design, such as recesses of any suitable shape.

The invention may alternatively or additionally include further features and/or components. The first plurality of fastener holes may be located at a radially inward position on the rotor locking disc relative to the rotor locking elements. In addition, or alternatively, one or more fastener holes may be positioned between adjacent rotor locking elements. The rotor locking disc may further comprise a transition section positioned between the main shaft and the rotor locking elements. The transition section may have an average thickness greater than the average thickness in a radially outer section containing the rotor locking elements. The section of the rotor locking disc containing the rotor locking elements may be offset in a rearward direction relative to an adjacent portion of the transition section. The rotor locking elements may further comprise open perimeter recesses in which the perimeters of the recesses open to an outer circumference of the rotor locking disc. Alternatively, these rotor locking elements may be comprised of complete or continuous closed perimeter recesses as in conventional technology. The open perimeter recesses may be generally U-shaped.

As additional aspects, a second plurality of fastener holes may be provided in the peripheral region of the rotor locking disc. The first plurality of fastener holes may be located at a position radially inward of the rotor locking elements and the second plurality of fastener holes may be located between adjacent rotor locking elements.

The first and/or second pluralities of fastener holes are used to receive fasteners to secure the main shaft to the rotor hub. A third plurality of fastener holes may be provided in the peripheral region of the rotor locking disc positioned radially outwards of said second set of fastener holes, wherein both the second and third pluralities of fastener holes may be located between adjacent rotor locking elements. At least some of the fastener holes may be of a different diameters. Or, some or all fastener holes may be of the same diameter. The fastener holes located between the rotor locking elements may be of a smaller diameter than the first plurality of fastener holes.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
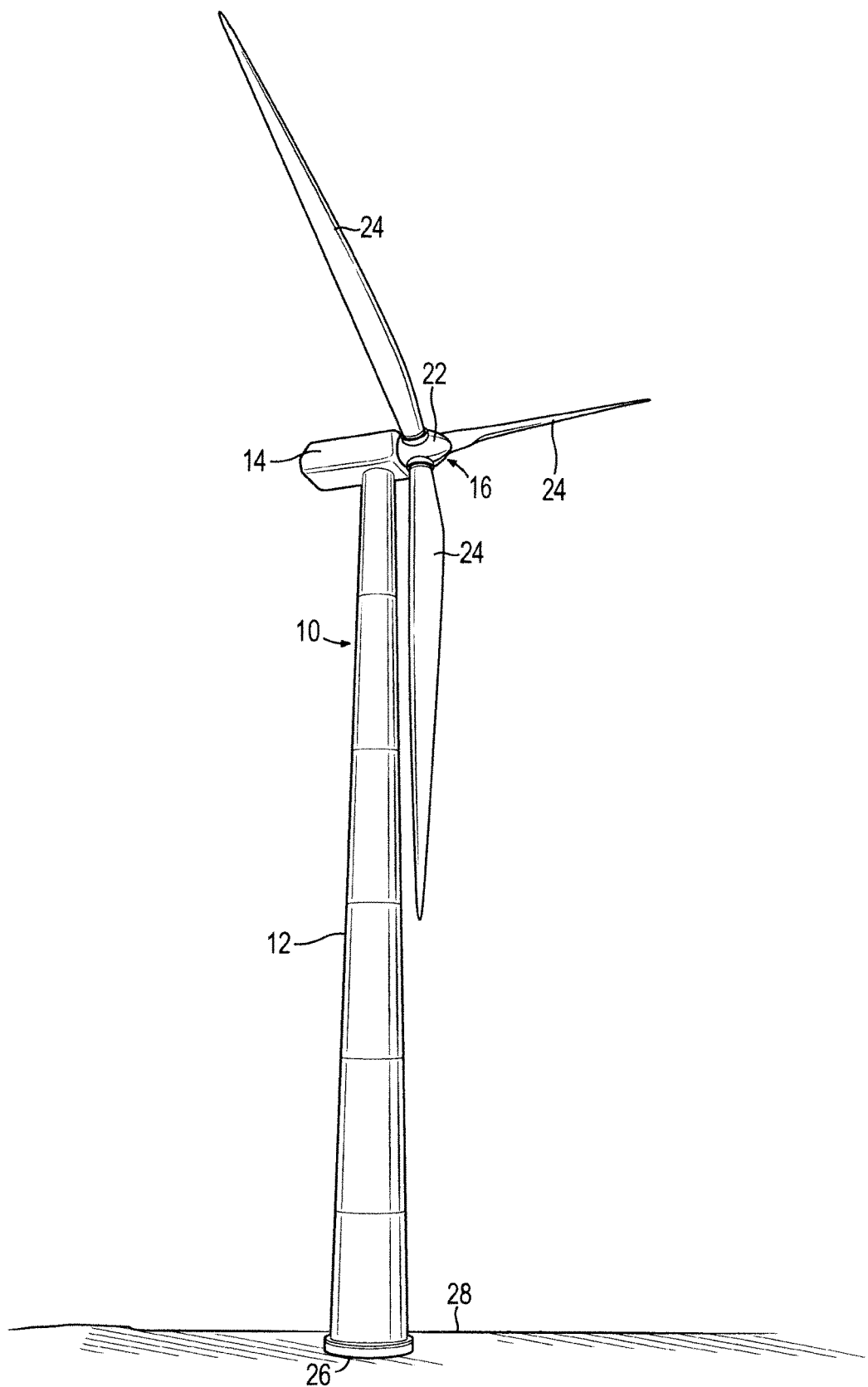
FIG. 1 is a perspective view of a wind turbine constructed in accordance with an illustrative embodiment of the invention.

Referring first to FIG. 1, a wind turbine 10 is shown and is constructed with a tower 12, a nacelle 14, and a rotor 16 coupled for rotation relative to the nacelle 14. The rotor 16 generally comprises a rotor hub 22 and three turbine blades 24 fixed for rotation with the rotor hub 22. As shown, the tower 12 includes a base 26 fixed to a support surface 28 which may, for example, be a foundation in the ground or any other suitable support surface including a platform at sea.

Figure 2:
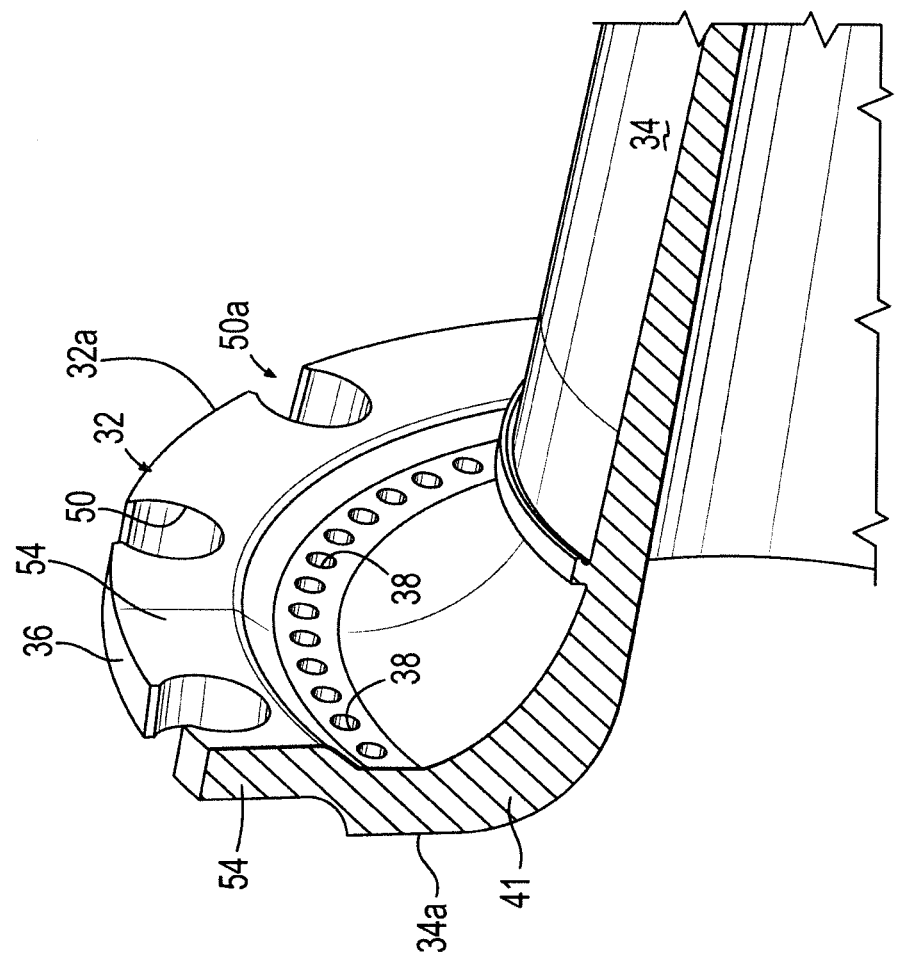
FIG. 2 is an enlarged perspective view cross sectioned to illustrate an integral construction of a main shaft and rotor locking disc in one illustrative embodiment of the invention.
Figure 3:
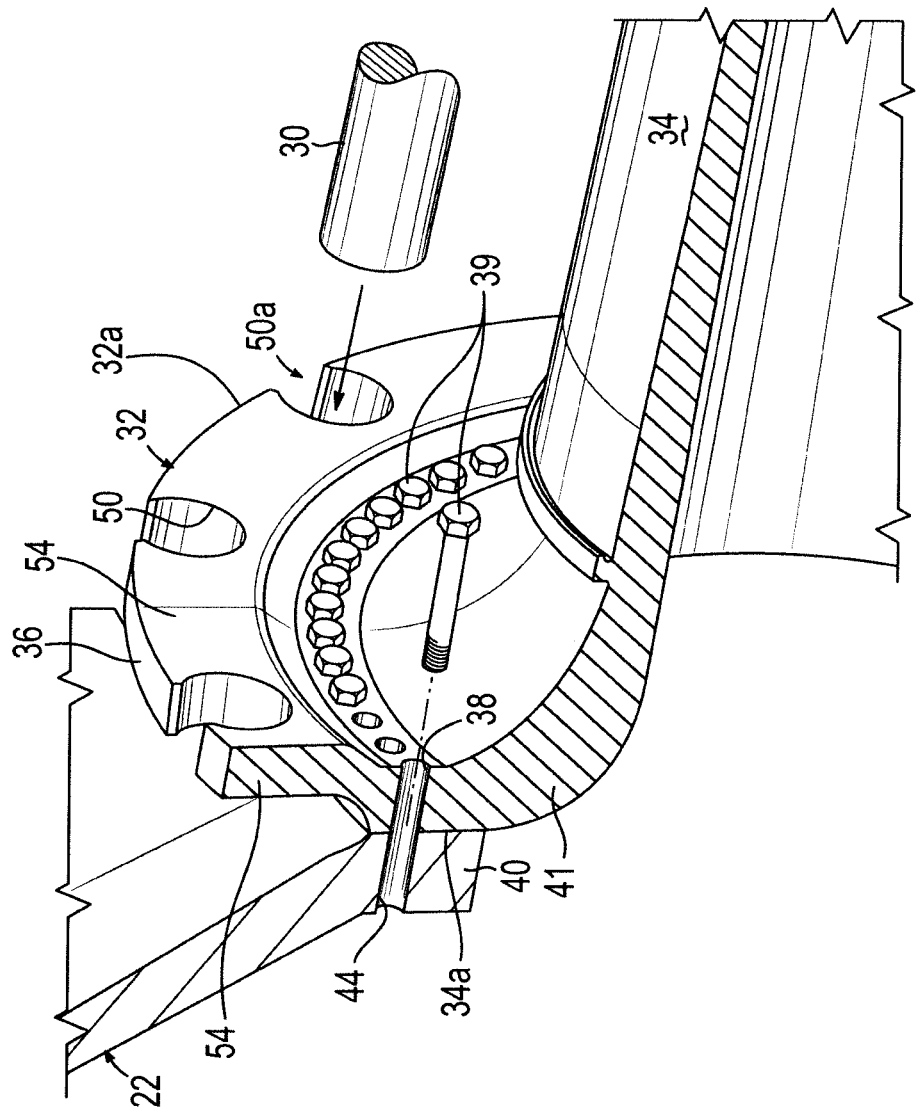
FIG. 3 is an enlarged perspective view cross sectioned to illustrate the connection between the main shaft and rotor hub using the integrated locking disc, and schematically showing the use of locking pins.

Referring now to FIGS. 1-3, a first illustrative embodiment is shown. At times the rotor 16 must be fixed against any rotation. For example, these time periods may include maintenance periods or other times during which the wind turbine 10 is not in use. For this purpose, the wind turbine 10 includes a braking system and control (not shown) which will be used to slow and then stop the rotor 16 from rotating. The control will be used to activate a rotor lock system that comprises a plurality of rotor locking pins 30 engageable and disengageable with a rotor locking disc 32 integrally formed with the main shaft 34, as further described below. For example, the rotor locking disc 32 and the main shaft 34 may be formed as an integral metal casting or otherwise formed such that the rotor locking disc 32 is integrated as one piece with the main shaft 34. As shown, the rotor locking disc 32 is generally located in a plane perpendicular to the longitudinal axis or lengthwise extent of the main shaft 34. The main shaft 34 is coupled to a generator directly or through other drive components (not shown). The main shaft 34 further includes a front end portion 34a. The front end portion 34a includes a first connecting structure 36. The rotor hub 22 includes a second connecting structure 40 configured to mate with the first connecting structure 36 on the front end portion 34a of the main shaft 34. These connecting structures 36, 40 are fixed rigidly together using one or more sets of threaded bolts 39 extending through respective holes 38 of a transition section 41 and into holes 44 provided in the rotor hub 22. The transition section 41 may be part of the integrally formed rotor locking disc 32. As shown, the rotor locking disc 32 is carried proximate or near the front end portion 34a of the main shaft 34. One advantage of forming the rotor locking disc 32 as an integrated portion of the main shaft 34 is the resulting weight savings and, therefore, cost savings due to the elimination of a rotor locking disc 32 separate from the main shaft 34. Also, eliminating the separate connections needed for a separate rotor locking ring simplifies the assembly and installation process and reduces costs and the potential for accidents or mistakes during assembly.

As further shown in FIGS. 2 and 3, the rotor locking disc 32 has a generally circular outer circumference 32a and a plurality of open perimeter recesses 50 in a face of the rotor locking disc 32. The recesses 50 have openings 50a communicating or intersecting with the outer circumference 32a. In other words, and unlike conventional closed perimeter recesses in axial locking systems, there is an area or opening 50a in which there is no disc material radially outward of the recess 50. In other embodiments, the rotor locking elements 50 may comprise any other configurations, such as conventional circular or other continuous or closed perimeter recesses. The recesses may be complete through bores or blind bores. Embodiments having closed perimeter recesses also have advantages and will be described further below as options in connection with FIGS. 4 and 5. At least one rotor locking pin 30 is movable in an axial direction parallel to the lengthwise axis of the main shaft 34. The pin 30 moves between a disengaged position relative to at least one of the recesses 50 and an engaged position at least partially located in one of the recesses 50 for locking the rotor hub 22 against rotation. The recesses 50 are shown as partially circular in shape, (e.g., generally U-shaped) and the pins 30 have a complementary cylindrical shape for closely extending at least partially into an aligned recess 50. Other shapes may be used instead. Two rotor locking pins 30, for example, may be located at the three o'clock and nine o'clock positions relative to the disc 32 and may be driven along their respective axes by suitable drive components (not shown) between extended and retracted positions. In the extended position, the pins 30 will have their ends at least partially received in a respective aligned recess 50 thereby locking the rotor hub 22 and main shaft 34 against any rotation. For achieving this purpose, it will be appreciated that the pins 30 are part of a rotor locking system in the nacelle 14 (FIG. 1) that is rigidly secured and fixed in place with components that are not shown for the sake of conciseness. However, these components of the rotor locking system are well known to those of skill in the art. In the retracted position, the pins 30 will disengage the recesses 50 along the same axial path as the engagement movement previously described but in the opposite direction. This disengagement will unlock and allow rotation of the rotor hub 22 and main shaft 34.

The rotor locking disc 32 further includes one or more reduced thickness areas 54 adjacent recesses 50. These reduced thickness areas 54, like the recesses 50, may be of any desired number. Overall, the average thickness of the material at the area of the recesses 50 is less than the average thickness of material in the transition section 41. For optimal strength characteristics, the fastener holes 38 may be located in the transition section 41, radially inward of the recesses 50. However, as also discussed below, other locations for fastener holes are possible as well. Also, the section of the rotor locking disc 32 containing the rotor locking elements or recesses 50 may be offset in a rearward direction relative to an adjacent portion of the transition section 41.

There may be more than one reduced thickness area 54 between or otherwise adjacent recesses 50 and/or, at one or more locations, there may not be any reduced thickness area 54 between adjacent recesses 50. As shown in this embodiment, the entire area adjacent the recesses 50 is of reduced thickness as compared to the transition section 41 located immediately radially inward of the recesses 50. The reduced thickness areas 54 provide a manner to reduce overall weight of the disc 32 while still optimizing strength and stress distribution characteristics necessary to accommodate the large forces between the disc 32 and the pins 50. The outer diameter of the rotor locking disc 32 is smaller than the outer diameter of a conventional rotor locking ring having through holes near the periphery for receiving rotor locking pins 30. This reduction in diameter further increases accessibility to the rotor hub 22 and reduces weight of the rotor locking disc 32 while enabling optimization of strength and stress characteristics, as well as allowing more design freedom for the shape and configuration of the disc 32. Further, more design freedom thereby exists for components near the rotor locking disc 32 in the nacelle 14 (FIG. 1), including the nacelle 14 itself, as the height/width of the rotor locking disc 32 will often be a larger part of the dimensions of the nacelle 14.

Figure 4:
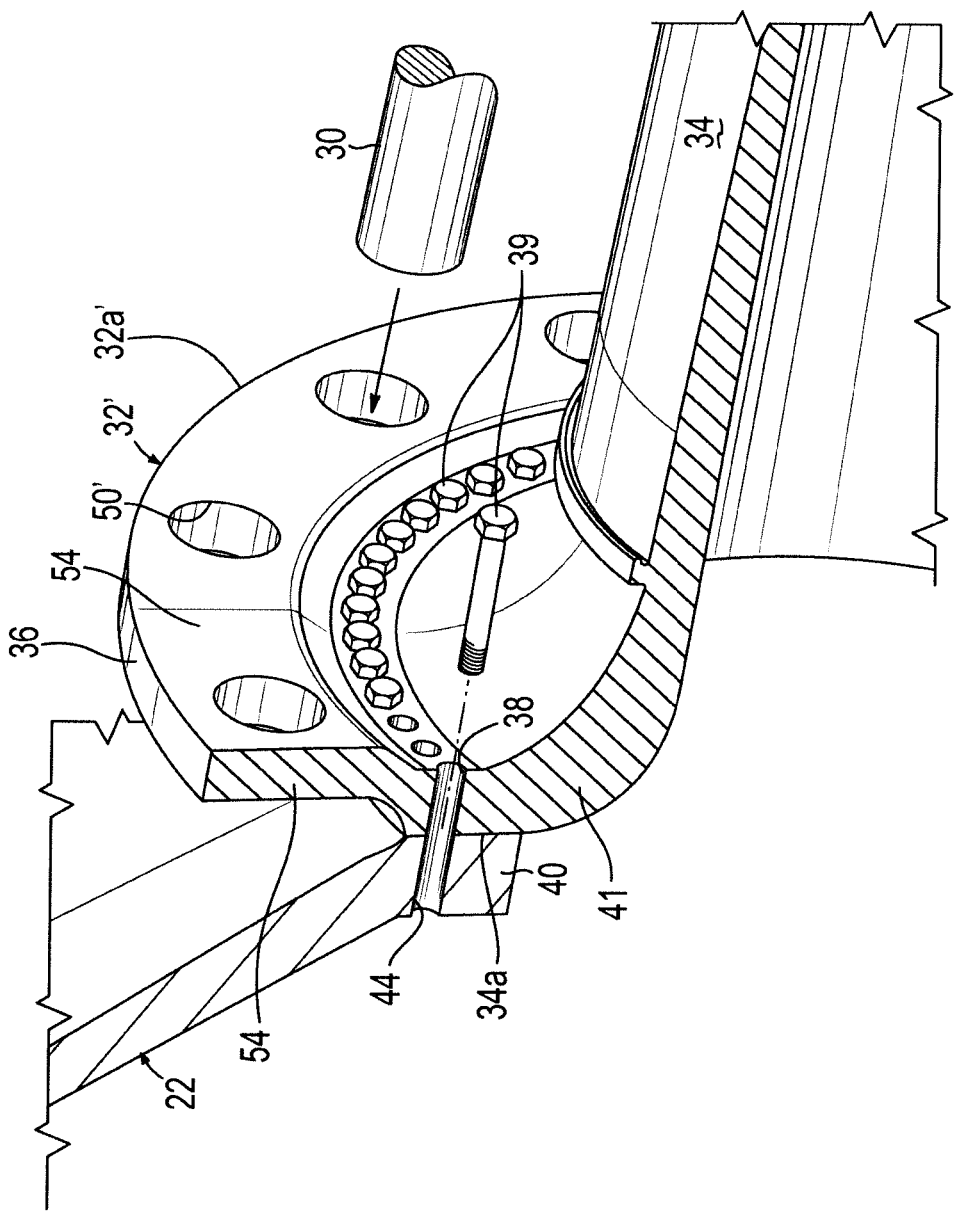
FIG. 4 is a view similar to FIG. 3, but illustrating an alternative embodiment of the integrated locking disc including closed perimeter recesses as the rotor locking elements.

FIG. 4 illustrates another embodiment of the invention. This embodiment may be formed as described generally above in connection with the first embodiment, but may further include differences as shown and described with respect to FIG. 4. In this figure, the same reference numerals are used to describe common features or components with respect to the first embodiment and need no further detailed discussion. Features or components that are slightly different from analogous features or components of the first embodiment are denoted with the same reference numerals but also include prime (') marks. This embodiment further illustrates closed perimeter recesses 50' as opposed to the open perimeter recesses 50 of the previous embodiments, but retains the advantageous feature of having a rotor locking disc 32' integrated with the main shaft 34 as described above.

Figure 5:
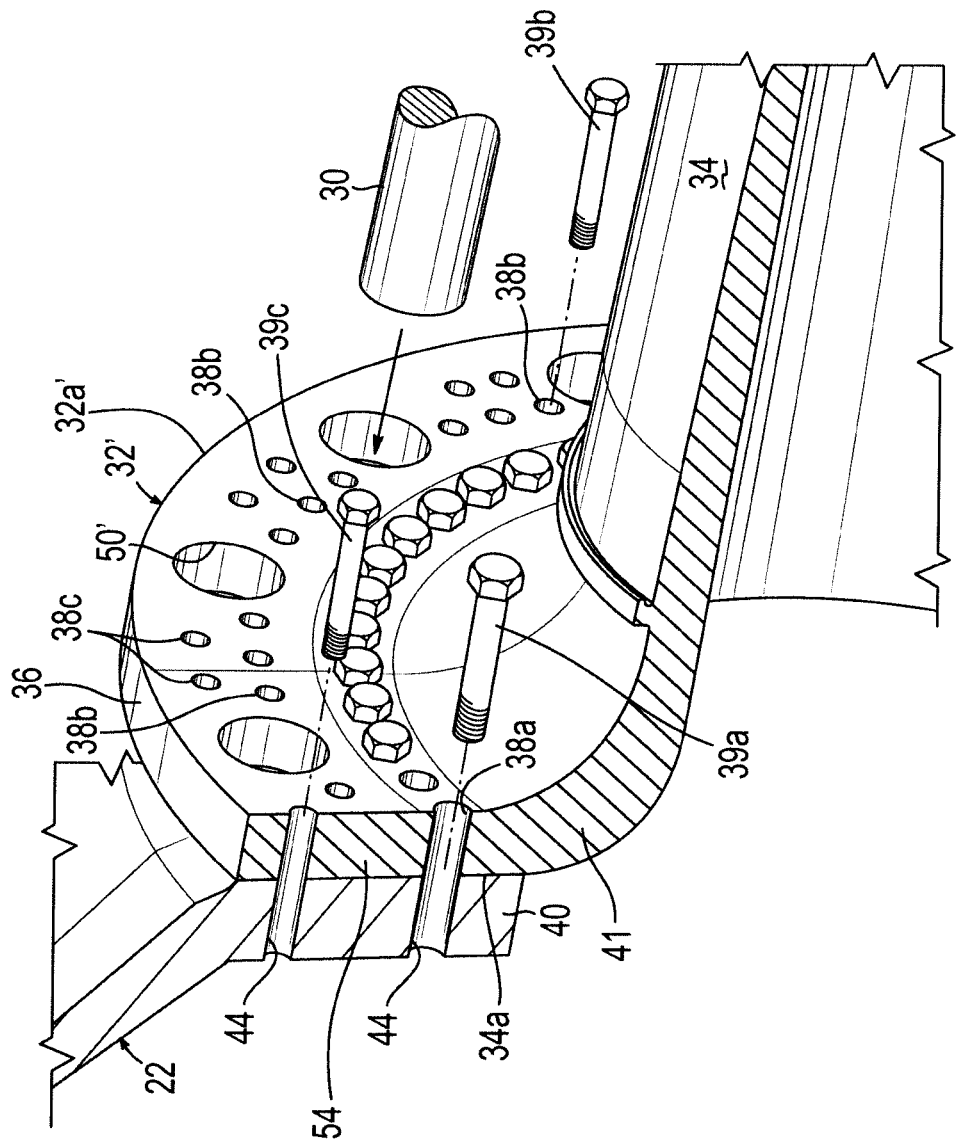
FIG. 5 is a view similar to FIG. 4, but illustrating another alternative embodiment of the integrated locking disc including multiple sets of fastener holes.

FIG. 5 illustrates another embodiment of the invention. This embodiment may be formed as described generally above in connection with the first and/or second embodiments, but may further include differences as shown and described with respect to FIG. 5. In this figure, the same reference numerals are used to describe common features or components with respect to the first and second embodiments and need no further detailed discussion. Features or components that are slightly different from analogous features or components of the first and second embodiments are denoted with the same reference numerals but also include prime (') marks. This embodiment illustrates closed perimeter recesses 50' as opposed to the open perimeter recesses 50 of the previous embodiments, but retains the advantageous feature of having a rotor locking disc 32' integrated with the main shaft 34 as described above. It will be appreciated that this embodiment may also have rotor locking elements of any desired shape or configuration, such as open perimeter recesses 50.

More specifically, the first connecting structure 36 shown in FIG. 5 comprises at least first and second sets or pluralities of fastener holes 38a, 38b in the peripheral region of the rotor locking disc 32'. The first set of fastener holes 38a is located at a position radially inward of the rotor locking elements 50' and the second and third sets of fastener holes 38b, 38c are located in the spaces of the locking disc 32' between adjacent rotor locking elements 50'. There may be only holes 38b or 38c located between adjacent rotor locking elements 50', or both sets may be located between adjacent rotor locking elements 50'. In addition, there may be additional holes (not shown) located radially outward of the rotor locking elements 50'. Fastener holes 38a, 38b, and 38c may each have the same diameter. But, as shown here, holes 38b and 38c are of smaller diameter than holes 38a. The diameters may be of any desired or necessary size for the application. While there are advantages of using sets of fastener holes having different diameters, there are independent advantages of locating fastener holes between adjacent rotor locking elements 50'. In this regard, the space between adjacent rotor locking elements 50' is efficiently used for connection purposes by placement of one or more fastener holes in these spaces, regardless of the size of the fastener holes and regardless of the particular design or configuration of the rotor locking elements.

The fastener holes 38a, 38b and/or 38c are used to receive suitable fasteners such as bolts 39a, 39b, 39c to secure the main shaft 34 to the rotor hub 22. When making certain connections between a main shaft 34 and a rotor hub 22, it may be desirable to use all three sets of fastener holes 38a, 38b, 38c. As one of many examples, it may be necessary to use only the first set of fastener holes 38a and corresponding bolts 39a for securing the main shaft 34 to the rotor hub 22. If all holes 38a, 38b, 38c have the same corresponding diameter, then a single size of bolts, such as bolts 39a, may be used as necessary in each of the holes 38a, 38b, 38c. In other situations, multiple sizes of bolts may be used instead.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A wind turbine (10), comprising:
a main shaft including a front end portion, the front end portion including a first connecting structure comprised of a first plurality of fastener holes;
a rotor hub including a second connecting structure, wherein the first connecting structure of the main shaft is fixed to the second connecting structure of the rotor hub using the first plurality of fastener holes;
a plurality of blades coupled to the rotor hub; and
a rotor locking disc integrally formed on the front end portion of the main shaft, the rotor locking disc having a peripheral region and a plurality of rotor locking elements in the peripheral region for receiving one or more rotor locking pins moved in an axial direction relative to the lengthwise axis of the main shaft.

2. The wind turbine of claim 1, wherein the first plurality of fastener holes is located at a radially inward position on the rotor locking disc relative to the rotor locking elements.

3. The wind turbine of claim 1, further comprising:
a second plurality of fastener holes in the peripheral region of the rotor locking disc, the first plurality of fastener holes located at a position radially inward of the rotor locking elements and the second plurality of fastener holes located between adjacent rotor locking elements, wherein the first and/or second pluralities of fastener holes are used to receive fasteners to secure the main shaft to the rotor hub.

4. The wind turbine of claim 3, further comprising:
a third plurality of fastener holes in the peripheral region of the rotor locking disc positioned radially outwards of said second set of fastener holes, wherein both the second and third pluralities of fastener holes are located between adjacent rotor locking elements.

5. The wind turbine of claim 3, wherein at least some of the fastener holes are of different diameters.

6. The wind turbine of claim 1, wherein all the fastener holes are of the same diameter.

7. The wind turbine of claim 3, wherein the fastener holes located between the rotor locking elements are of a smaller diameter than the first plurality of fastener holes.

8. The wind turbine of claim 1, wherein the rotor locking elements further comprise recesses having open perimeters intersecting an outer circumference of the rotor locking disc.

9. The wind turbine of claim 8, wherein the recesses are generally U-shaped.

10. The wind turbine of claim 1, wherein the rotor locking elements further comprise recesses each defined by a closed perimeter.

11. The wind turbine of claim 1, wherein the rotor locking disc further comprises a transition section positioned between the main shaft and the rotor locking elements, wherein the transition section has an average thickness greater than the average thickness in a radially outer section containing the rotor locking elements.

12. The wind turbine of claim 10, wherein the section of the rotor locking disc containing the rotor locking elements is offset in a rearward direction relative to an adjacent portion of the transition section.

\* \* \* \* \*